United States Patent
Aoki et al.

(10) Patent No.: US 9,845,918 B2
(45) Date of Patent: Dec. 19, 2017

(54) GAS STORAGE/SUPPLY SYSTEM

(71) Applicant: KABUSHIKI KAISHA TOYOTA CHUO KENKYUSHO, Nagakute-shi, Aichi-ken (JP)

(72) Inventors: Masakazu Aoki, Nagakute (JP); Takafumi Yamauchi, Nagakute (JP); Yasuki Hirota, Nagakute (JP); Takashi Shimazu, Nagakute (JP)

(73) Assignee: Kabushiki Kaisha Toyota Chuo Kenkyusho, Nagakute (JP)

( * ) Notice: Subject to any disclaimer, the term of this patent is extended or adjusted under 35 U.S.C. 154(b) by 228 days.

(21) Appl. No.: 14/697,225

(22) Filed: Apr. 27, 2015

(65) Prior Publication Data
US 2015/0323134 A1 Nov. 12, 2015

(30) Foreign Application Priority Data

May 9, 2014 (JP) .................................. 2014-098114

(51) Int. Cl.
F17C 11/00 (2006.01)
F28D 20/00 (2006.01)

(52) U.S. Cl.
CPC .......... *F17C 11/005* (2013.01); *F17C 11/007* (2013.01); *F17C 2227/0327* (2013.01); *F28D 20/003* (2013.01); *Y02E 60/321* (2013.01)

(58) Field of Classification Search
CPC ................ Y02E 60/321; F28D 20/003; F28D 2021/0047; F17C 11/005
(Continued)

(56) References Cited

U.S. PATENT DOCUMENTS 4,040,410 A * 8/1977 Libowitz .................. C09K 5/16
126/619
4,566,281 A 1/1986 Sandrock et al.
(Continued)

FOREIGN PATENT DOCUMENTS

JP S60-46901 A 3/1985
JP S63-62254 B2 12/1988
(Continued)

OTHER PUBLICATIONS

Otsuki, JP2009264448MT (English Translation), Nov. 2009.*
Mar. 29, 2016 Office Action issued in Japanese Patent Application No. 2014-098114.

*Primary Examiner* — Justin Jonaitis
*Assistant Examiner* — Eric Ruppert
(74) *Attorney, Agent, or Firm* — Oliff PLC (57) ABSTRACT

A gas storage/supply system includes a gas storage material capable of reversibly absorbing and desorbing a gas, a gas storage tank having the gas storage material sealed therein, a chemical heat storage material capable of making a forward reaction and a reverse reaction with an operation medium, a chemical heat storage tank having the chemical heat storage material sealed therein, a heat exchange mechanism for transferring heat between the gas storage tank and the chemical heat storage tank, and a control mechanism for controlling the gas storage/supply system such that gas absorption heat released upon absorption of the gas to the gas storage material is stored in the chemical heat storage tank and gas desorption heat which is necessary for desorption of the gas from the gas storage material is supplied from the chemical heat storage tank.

5 Claims, 2 Drawing Sheets (58) Field of Classification Search
USPC .............................. 165/104.12; 62/46.2, 46.3
See application file for complete search history.

(56) References Cited

U.S. PATENT DOCUMENTS

| | | | | |
|---|---|---|---|---|
| 4,829,772 A | * | 5/1989 | Bogdanovic | ............. C09K 5/16 |
| | | | | 165/104.12 |
| 2012/0061397 A1 | * | 3/2012 | Fruchart | ............... C01B 3/0005 |
| | | | | 220/560.04 |

FOREIGN PATENT DOCUMENTS

| | | | |
|---|---|---|---|
| JP | 2000-012062 A | | 1/2000 |
| JP | 2003-306302 A | | 10/2003 |
| JP | 2003-306303 A | | 10/2003 |
| JP | 2006-162057 A | | 6/2006 |
| JP | 2006-177434 A | | 7/2006 |
| JP | 2007-146872 A | | 6/2007 |
| JP | 2009-257686 A | | 11/2009 |
| JP | 2009264448 | * | 11/2009 |

* cited by examiner

GAS STORAGE/SUPPLY SYSTEM

BACKGROUND OF THE INVENTION

Field of the Invention

The present invention relates to a gas storage/supply system and, more specifically, it relates to a gas storage/supply system of storing heat that is released upon absorption of a gas to a gas storage material in a chemical heat storage material and supplying heat that is necessary when the gas storage material desorbs a gas from the chemical heat storage material.

Description of the Related Art

"The gas storage material" means a material capable of reversibly absorbing and desorbing a gas such as hydrogen, ammonia, and methane. Generally, the gas storage material generates heat upon gas absorption and absorbs heat upon gas desorption.

The heat released during gas absorption (gas absorption heat) is usually discarded to the atmospheric air by way of a heat exchanger or the like and the heat necessary for gas desorption (gas desorption heat) is supplied from an external heat source. Accordingly, existent gas storage/supply systems involve a problem of low energy utilization efficiency.

For solving the problem, various proposals have been made so far.

For example, Patent Literature 1 discloses a hydrogen storing/supplying device including:

a hydrogen absorbing alloy, a latent heat storage material (for example, $CaCl_2 \cdot 6H_2O$) that stores heat from the hydrogen absorbing alloy upon absorption of a hydrogen gas and gives heat which is necessary when the hydrogen absorbing alloy desorbs the hydrogen gas, a heat exchanger for conducting heat exchange with the hydrogen absorbing allay, and a pressure container containing the hydrogen absorbing alloy, the latent heat storage material and the heat exchanger, in which the latent heat storage material is housed in a plurality of sealed containers and mixed in the hydrogen absorbing alloy.

The reference describes that the device can decrease the energy for cooling and heating supplied from the outside without deteriorating the characteristics of absorbing and desorbing the hydrogen gas.

Patent Literature 2 discloses an absorption/desorption system of filling a hydridable material in a pressure resistant bottle, housing the pressure resistant bottle in a heat insulation container, and filling a heat storage medium (for example, molten sodium sulfate deca-hydrate) between the pressure resistant bottle and the heat insulation container.

The reference describes that the system provided with the heat storage medium can continuously release a greater amount of hydrogen over a longer time compared with a system not provided with the heat storage medium.

As described in the Patent Literatures 1 and 2, when gas absorption heat is stored by using the latent heat storage material, some of the gas desorption heat can be supplied from the latent heat storage material to the hydrogen absorbing alloy during gas desorption. Accordingly, more hydrogen can be desorbed compared with the case not using the latent heat storage material.

However, since the latent heat storage material has a low heat storage density, a large heat storage tank is necessary for ensuring a necessary quantity of heat. Further, since the time capable of storing heat is short, heat cannot be supplied at an optional timing.

Further, since the existent heat storage system has large sensible heat loss, all of the gas desorption heat released from the hydrogen absorbing alloy cannot be stored by the latent heat storage material and there is also a limit to the rate of heat exchange.

CITATION LIST

Patent Literature

[Patent Literature 1] Japanese Unexamined Patent Application Publication No. 2006-177434
[Patent Literature 2] Japanese Examined Patent Application Publication No. S63-062254

SUMMARY OF THE INVENTION

For solving a subject, the present invention intends to provide a gas storage/supply system capable of storing gas absorption heat of a gas storage material in a heat storage material and reutilizing the stored gas absorption heat as gas desorption heat.

For solving a further subject, the present invention intends to provide a gas storage/supply system having a high heat storage density for the gas absorption heat and capable of storing heat for a long time.

For solving a still further subject, the present invention intends to provide a gas storage/supply system capable of reducing the size of heat storage means and supplying heat at an optional timing.

For solving a still further subject, the present invention intends to provide a gas storage/supply system capable of decreasing the sensible heat loss during heat exchange between a gas storage material and a heat storage material and also having a high rate of heat exchange.

A gas storage/supply system according to the present invention for solving the subjects described above includes:

a gas storage material capable of reversibly absorbing and desorbing a gas, a gas storage tank having the gas storage material sealed therein, a chemical heat storage material capable of reversibly making a forward reaction and a reverse reaction with an operation medium, a chemical heat storage tank having the chemical heat storage material sealed therein, a heat exchange mechanism for transferring heat between the gas storage tank and the chemical heat storage tank, and a control mechanism for controlling the gas storage/supply system such that gas absorption heat released upon absorption of the gas to the gas storage material is stored in the chemical heat storage tank, and gas desorption heat which is necessary for desorption of the gas from the gas storage material is supplied from the chemical heat storage tank.

The heat exchange mechanism is preferably
(a) a heat medium flow channel for circulating a heat exchange medium between the gas storage tank and the chemical heat storage tank, and/or
(b) a heat transfer wall provided at the boundary between the gas storage tank and the chemical heat storage tank.

The gas storage/supply system according to the present invention has a chemical heat storage tank for storing gas absorption heat and reutilizing the same as gas desorption heat. Accordingly, the quantity of heat input from the outside upon gas desorption can be decreased to improve the energy utilization efficiency. Further, since the chemical heat storage material is used as the heat storage means, a heat storage density is high and the heat can be supplied from the chemical heat storage tank to the gas storage tank at an optional timing.

Further, when the heat transfer wall is used as the heat exchange mechanism (that is, when the gas storage tank and the chemical heat storage tank are integrated by way of the heat transfer wall), the heat medium flow channel is not necessary. Further, when a plurality of gas storage tanks and a plurality of the chemical heat storage tanks are stacked by way of the heat transfer walls, a heat exchange area increases. As a result, sensible heat loss upon heat exchange between the gas storage tank and the chemical heat storage tank is reduced and a rate of the heat exchange is also improved.

DETAILED DESCRIPTION OF THE PREFERRED EMBODIMENTS

Hereinafter, a preferred embodiment of the present invention will be described in detail.

[1. Gas Storage/Supply System]

A gas storage/supply system according to the present invention includes:

a gas storage material capable of reversibly absorbing and desorbing a gas, a gas storage tank having the gas storage material sealed therein, a chemical heat storage material capable of reversibly making a forward reaction and a reverse reaction with an operation medium, a chemical heat storage tank having the chemical heat storage material sealed therein, a heat exchange mechanism for transferring heat between the gas storage tank and the chemical heat storage tank, and a control mechanism for controlling the gas storage/supply system such that gas absorption heat released upon absorption of the gas to the gas storage material is stored in the chemical heat storage tank, and gas desorption heat which is necessary for desorption of the gas from the gas storage material is supplied from the chemical heat storage tank.

Further, the gas storage/supply system may also have an auxiliary heating mechanism for heating the chemical heat storage material and/or the gas storage material.

[1.1. Gas Storage Tank]

"A gas storage tank" means a tank for sealing a gas storage material therein.

"A gas storage material" means a material capable of reversibly absorbing and desorbing a gas. Generally, the gas storage material generates heat upon gas absorption and absorbs heat upon gas desorption.

Accordingly, the gas storage tank may be adopted such that the tank can (a) seal the gas storage material,
(b) supply, discharge, and possess the gas, and
(c) withstand a pressure change and a temperature change caused during absorption and desorption of the gas.

So long as these conditions are satisfied, material, configuration, and size of the gas storage tank and filling method of the gas storage material, etc. are not particularly restricted, and they can be selected optimally depending on the purpose.

Further, the gas storage tank is provided with (a) a gas supply mechanism for supplying a gas to be absorbed in the gas storage material from a gas supply source (for example, a gas cylinder) to the gas storage tank, and
(b) a gas discharge mechanism for supplying the gas desorbed from the gas storage material from the gas storage tank to a gas consumption device (for example, a fuel cell)

The gas storage tank may be adapted to supply and discharge the gas by way of independent channels, that is, may be provided with an independent gas supply mechanism and an independent gas discharge mechanism.

Alternatively, the gas storage tank may be adapted to supply and discharge the gas by using a single channel, that is, the gas storage tank may be provided with a single gas supply/discharge mechanism having a channel switchable between the gas supply source and the gas consumption device.

The gas supply mechanism and/or the gas discharge mechanism includes, specifically, pipelines that connect the gas supply source and/or gas consumption device with a gas storage tank, valves for opening and closing the pipelines, a pressure controller, a gas flow controller, etc.

Figure 1:
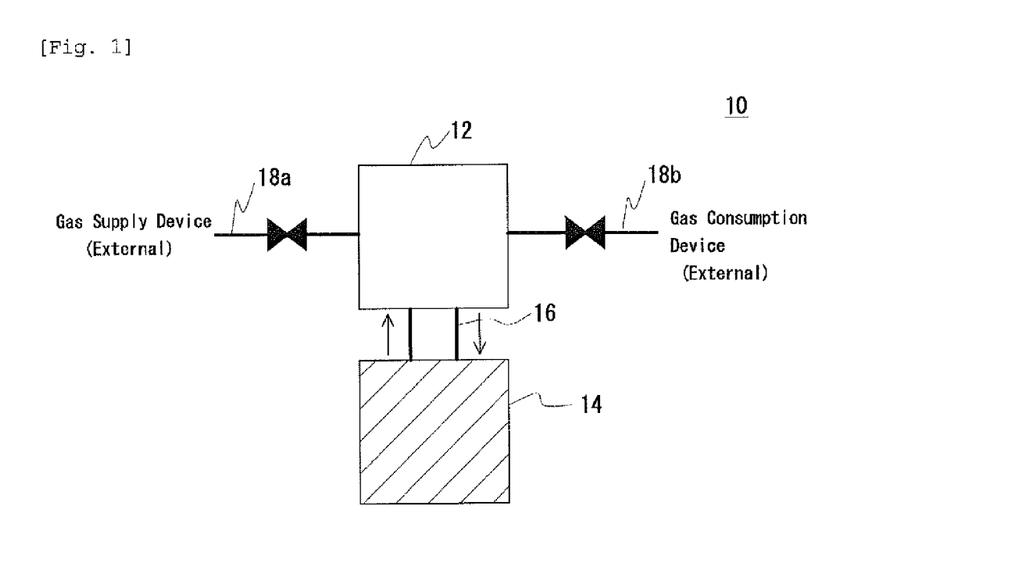
FIG. 1 is a schematic view of a gas storage/supply system according to a first embodiment of the present invention.
Figure 2:
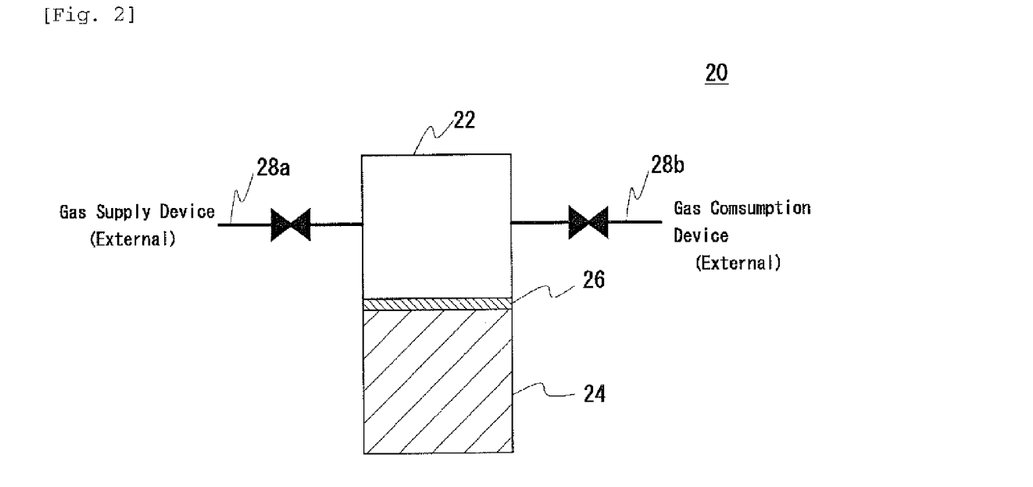
FIG. 2 is a schematic view of a gas storage/supply system according to a second embodiment of the present invention.
Figure 3:
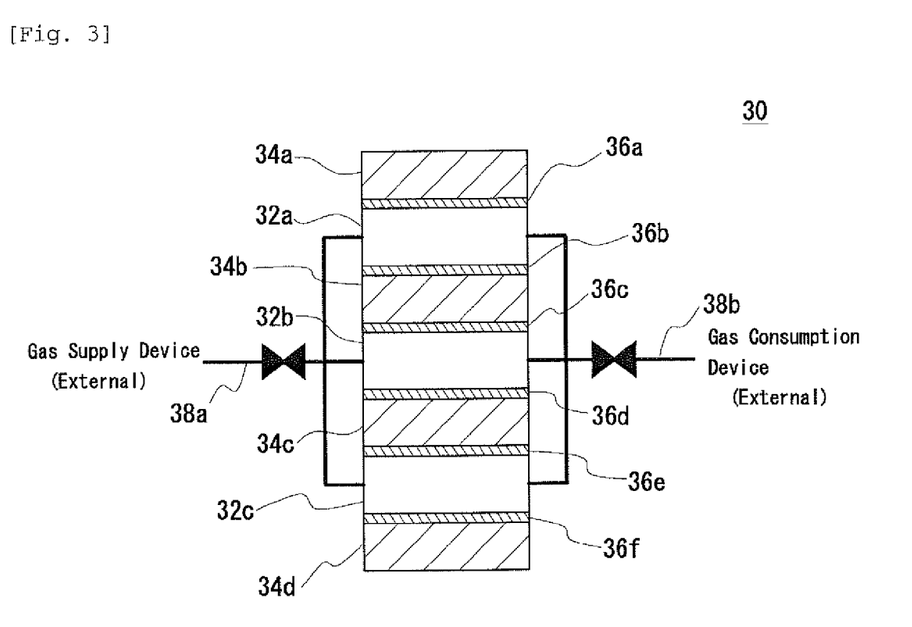
FIG. 3 is a schematic view of a gas storage/supply system according to a third embodiment of the present invention.

The gas storage tank may be a tank independent of the chemical heat storage tank (refer to FIG. 1) or, alternatively, the gas storage tank may be integrated by way of a heat transfer wall to the chemical heat storage tank (refer to FIG. 2 and FIG. 3). This is to be described later.

[1.2. Chemical Heat Storage Tank]

"A chemical heat storage tank" means a tank for sealing a chemical heat storage material therein.

"A chemical heat storage material" means a material capable of reversibly making a forward reaction and a reverse reaction with an operation medium. Generally, the chemical heat storage material generates heat upon reaction (bonding) with an operation medium and absorbs heat upon reverse reaction (desorption) with the operation medium.

Therefore, the chemical heat storage tank may be adapted such that the tank can (a) seal a chemical heat storage material therein,
(b) supply, discharge and possess the operation medium, and
(c) withstand a pressure change and a temperature change caused during the forward reaction and reverse reaction between the chemical heat storage material and the operation medium.

So long as these conditions are satisfied, material, configuration, and size of the chemical heat storage tank and filling method of the chemical heat storage material, etc. are not particularly restricted, and they can be selected optionally depending on the purpose.

Further, the chemical heat storage tank is provided with (a) an operation medium supply mechanism that supplies an operation medium for reaction with the chemical heat storage material from an operation medium supply source (for example, a water tank when the operation medium is water) to the chemical heat storage tank, and
(b) an operation medium discharge mechanism for discharging the operation medium desorbed from the chemical heat storage material from the chemical heat storage tank.

The operation medium discharged from the chemical heat storage tank may be discarded as it is, or may be recovered to the operation medium supply source and used repetitively. The method of recovering the operation medium is not particularly restricted, and an optimal method is preferably selected in accordance with the kind of the operation medium.

For example, when the operation medium is water, a water evaporative condenser is preferably connected to the chemical heat storage tank having the chemical heat storage material sealed therein.

Further, when the operation medium is ammonia, a container having a porous material capable of absorbing ammonia (for example, activated carbon) sealed therein is preferably connected to the chemical heat storage tank having the chemical heat storage material sealed therein.

Further, when the operation medium is hydrogen (that is, when the chemical heat storage material is a hydrogen storage material), a container having a hydrogen storage material that desorbs hydrogen at a temperature lower than that of the chemical heat storage material is preferably connected to the chemical heat storage tank having the chemical heat storage material sealed therein.

The chemical heat storage tank may be adapted to supply and discharge the operation medium by way of independent channels, that is, may be provided with an independent operation medium supply mechanism and an independent operation medium discharge mechanism.

Alternatively, the chemical heat storage tank may be adapted to supply and discharge the operation medium by using a single channel, that is, the chemical heat storage tank may be provided with a single operation medium supply/discharge mechanism for circulating the operation medium between the chemical heat storage tank and the operation medium supply source.

The operation medium supply mechanism and/or operation medium discharge mechanism includes, specifically, pipelines for connecting the operation medium source and/or external air and the chemical heat storage tank, valves for opening and closing the pipelines, an operation medium flow rate controller, etc.

[1.3. Heat Exchange Mechanism]

"A heat exchange mechanism" means a mechanism for transferring heat between the gas storage tank and the chemical heat storage tank. The heat exchange mechanism includes, for example, (a) a heat medium flow channel for circulating a heat exchange medium between the gas storage tank and the chemical heat storage tank (refer to FIG. 1),
(b) one or more heat transfer walls each provided at a boundary between the gas storage tanks and the chemical heat storage tanks (refer to FIG. 2, FIG. 3), and
(c) combination of (a) and (b).

When the gas storage tank and the chemical heat storage tank are provided being independent of each other and they are connected with a heat medium flow channel, heat can be exchanged between the gas storage tank and the chemical heat storage tank. While installation of the heat medium flow channel complicates a tank structure, the heat exchange efficiency is improved by optimizing the structure and the arrangement of the heat medium flow channel.

On the other hand, when the gas storage tank and the chemical heat storage tank are integrated by way of a heat transfer wall, heat can be exchanged between the gas storage tank and the chemical heat storage tank without complicating the tank structure. Alternatively, when each of the gas storage tank and the chemical heat storage tank is divided into plurality and both of the two kinds of tanks are stacked alternately, the heat exchange area increases. Accordingly, sensible heat loss during heat exchange between the gas storage tank and the chemical heat storage tank can be decreased, by which the heat exchange rate is also improved.

Further, when the heat medium flow channel and the heat transfer wall are used in combination, the sensible heat loss can be decreased further.

[1.4. Control Mechanism]

"A control mechanism" means a mechanism for controlling the gas storage/supply system such that the gas absorption heat which is released upon absorption of the gas to the gas storage material is stored in the chemical heat storage tank, and the gas desorption heat which is necessary for desorption of the gas from the gas storage material is supplied from the chemical heat storage tank.

The control mechanism includes, specifically, sensors for monitoring the temperature and the pressure of the gas storage tank, sensors for monitoring the temperature and the pressure of the chemical heat storage tank, a computer for controlling the timing of opening and closing each of the valves and the flow rate of the gas and/or the operation medium based on the output from the sensors.

The gas is supplied and discharged by the following procedures. The control mechanism executes the following procedures entirely or partially.

That is, when the pressure in the gas storage tank is lowered, the control mechanism opens the valve of the gas supply mechanism to supply a gas to the gas storage tank. The gas storage material absorbs the supplied gas and, concurrently, releases the gas absorption heat.

The gas absorption heat is transferred by way of the heat exchange mechanism to the chemical heat storage tank. Since the chemical heat storage material bonded with the operation medium is visually sealed in the chemical heat storage tank, the operation medium is desorbed from the chemical heat storage material in accordance with heat transfer. Further, the control mechanism opens the valve of the operation medium discharge mechanism while monitoring the temperature and the pressure inside the chemical heat storage tank and discharges the operation medium from the chemical heat storage tank.

On the other hand, when the gas is supplied to the gas consumption device, the control mechanism opens the valve of the operation medium supply mechanism to supply the operation medium to the chemical heat storage tank. The chemical heat storage material reacts with the supplied operation medium and, concurrently, releases the reaction heat.

The reaction heat is transferred by way of the heat exchange mechanism to the gas storage tank. Since the gas storage material that has absorbed the gas is usually sealed in the gas storage tank, the gas is desorbed from the gas storage material during the heat transfer. Further, the control mechanism opens the valve of the gas discharge mechanism while monitoring the temperature and the pressure in the gas storage tank to discharge a necessary amount of the gas from the gas storage tank.

[1.5. Auxiliary Heating Mechanism]

"An auxiliary heating mechanism" means a mechanism for heating the chemical heat storage material and/or the gas storage material by using an external heat source.

When a quantity of heat exchanged between the gas storage tank and the chemical heat storage tank by way of the heat exchange mechanism is relatively small, the entire amount of the operation medium bonded with the chemical heat storage material cannot be desorbed only by the gas absorption heat, or the entire amount of the gas desorption heat cannot be covered only by the quantity of heat released from the chemical heat storage material. In such a case, an auxiliary heating mechanism may also be provided to the chemical heat storage tank and/or the gas storage tank.

When the chemical heat storage material is heated by using the auxiliary heating mechanism, the entire amount of the operation medium is desorbed to increase the amount of heat storage of the chemical heat storage material.

Further, when the gas storage material is heated by using the auxiliary heating mechanism, the entire amount of the absorbed gas can be desorbed.

[1.6. Gas Storage Material]
[1.6.1. Gas]

The gas absorbed to and desorbed from the gas storage material is not particularly restricted, and an optimal gas can be selected depending on the purpose.

The gas includes, for example, hydrogen, ammonia, and methane.

[1.6.2 Composition of Gas Storage Material]

The composition of the gas storage material is not particularly restricted, and an optimal composition can be selected depending on the purpose. The gas storage material includes, for example:

(a) one or more materials selected from the group consisting of metals, hydrogen absorbing alloys, complex hydrides, hydrogen storage materials based on physical adsorption, and organic hydrides that absorb and desorb hydrogen, (b) one or more materials selected from the group consisting of metal halides, metal sulfates, porous oxides, and activated carbon that absorb and desorb ammonia, or (c) one or more materials selected from the group consisting of metal organic frameworks and porous coordination polymers that absorb and desorb methane.

[1.6.3. Sealed Form of Gas Storage Material]

The sealed form of the gas storage material in the gas storage tank is not particularly restricted, and an optimal form can be selected depending on the purpose.

For example, the gas storage material may be sealed in a powdery form, or may be sealed in a bulk form.

[1.6.4. Sealed Amount of Gas Storage Material]

A sealed amount of the gas storage material in the gas storage tank is not particularly restricted, and an optimal amount can be selected depending on the purpose.

[1.7. Chemical Heat Storage Material]
[1.7.1. Operation Medium]

An operation medium that makes a forward reaction and a reverse reaction with the chemical heat storage material is not particularly restricted, and an optimal operation medium can be selected depending on the purpose.

The operation medium includes, for example, hydrogen, ammonia, and water.

[1.7.2. Composition of Chemical Heat Storage Material]

The composition of the chemical heat storage material is not particularly restricted, and an optimal composition can be selected depending on the purpose. The chemical heat storage material includes, for example:

(a) one or more materials selected from the group consisting of metal oxides (for example, CaO and MgO), metal halides (for example, $CaCl_2$ and $MgCl_2$), and metal sulfates (for example, $CaSO_4$) using water as the operation medium, (b) one or more materials selected from the group consisting of metal halides and metal sulfates using ammonia as the operation medium, (c) one or more materials selected from the group consisting of metals (for example, Mg and V), hydrogen absorbing alloys (for example, $LaNi_5$, $TiMn_{1.5}$, and TiCrV), complex hydride (for example, $NaAlH_4$), and organic hydrides (for example, toluene) using hydrogen as the operation medium.

[1.7.3. Sealed Form of Chemical Heat Storage Material]

The sealed form of the chemical heat storage material in the chemical heat storage tank is not particularly restricted, and an optimal form can be selected depending on the purpose.

For example, the chemical heat storage material may be sealed in a powdery form or may be sealed in a bulk form.

[1.7.4. Sealed Amount of Chemical Heat Storage Material]

A sealed amount of the chemical heat storage material in the chemical heat storage tank is not particularly restricted, and an optimal amount can be selected depending on the purpose.

For example, the chemical heat storage material may be sealed in the chemical heat storage tank such that the heat storage amount of the chemical heat storage material is larger than the gas desorption heat of the gas storage material. In this case, it is difficult to desorb the entire amount of the operation medium from the chemical heat storage material only by gas absorption heat of the gas storage material. For desorbing the entire amount of the operation medium, an auxiliary heating mechanism of heating the chemical heat storage material is preferably used in combination.

Alternatively, the chemical heat storage material may be sealed in the chemical heat storage tank such that the quantity of heat stored in the chemical heat storage material is a quantity of heat obtained by subtracting the sensible heat loss of the gas storage tank and the chemical storage tank from the gas absorption heat of the gas storage material. In this case, although the entire amount of the operation medium can be desorbed from the chemical heat storage material only by the gas absorption heat, it is difficult to desorb the entire amount of the gas from the gas storage material only by the quantity of heat generated by the reaction of the chemical heat storage material. In order to desorb the entire amount of the gas, an auxiliary heating mechanism for heating the gas storage material is preferably used in combination.

[1.8. Combination of Gas Storage Material and Chemical Heat Storage Material]
[1.8.1. Condition of Heat Exchange]

In order to perform efficient heat exchange between the gas storage material and the chemical heat storage material, it is preferred that the following relations of formula (1) to formula (5) are established between the gas storage material and the chemical heat storage material:

$$\Delta H_{GA}/(R ln P_{GA}+\Delta S_{GA}) \geq \Delta H_{CD}/(R ln P_{CD}+\Delta S_{CD}) \quad (1)$$

$$\Delta H_{GD}/(R ln P_{GD}+\Delta S_{GD}) \geq \Delta H_{CA}/(R ln P_{CA}+\Delta S_{CA}) \quad (2)$$

$$1.5 \leq P_{GA} \leq 250 \quad (3)$$

$$1.5 \leq P_{GD} \leq 250 \quad (4)$$

$$P_{GD} \leq P_{GA} \quad (5)$$

where $\Delta H$ (kJ/mol of gas molecule) represents enthalpy change in the reaction, $\Delta S$ (J/K/mol of gas molecule) represents entropy change in the reaction, P (atm) represents a tank pressure,
R represents a gas constant,
subscript G represents the gas storage material,
subscript C represents the chemical heat storage material,
subscript A represents an absorption process and
subscript D represents a desorption process.

The left side of the formula (1) represents an equilibrium temperature (K) in the absorption process (A) of the gas to the gas storage material (G). The right side of the formula (1) represents an equilibrium temperature (K) in the desorption process (D) of the operation medium from the chemical heat storage material (C). When the formula (1) is satisfied, this means that the equilibrium absorption temperature of the gas is at or higher than the equilibrium desorption temperature of the operation medium, that is, heat transfers from the gas storage material to the chemical heat storage material when the gas storage material absorbs the gas.

The left side of the formula (2) represents the equilibrium temperature (K) in the desorption process (D) of the gas from the gas storage material (G). The right side of the formula (2) represents the equilibrium temperature (K) in the absorption process (A) of the operation medium to the chemical heat storage material (C). When the equation (2) is established, this means that the equilibrium absorption (bonding) temperature of the operation medium is at or higher than the equilibrium desorption temperature of the gas, that is, heat transfers from the chemical heat storage material to the gas storage material when the gas storage material desorbs the gas.

The formula (3) represents a pressure ($P_{GA}$) in the gas storage tank in the absorption process (A) of the gas.

If $P_{GA}$ is excessively low, the gas is not absorbed to the gas storage material or the gas storage amount is lowered. Accordingly, $P_{GA}$ is preferably 1.5 (atm) or higher. $P_{GA}$ is more preferably 3 (atm) or higher and, further preferably, 5 (atm) or higher.

On the other hand, if $P_{GA}$ is excessively high, it is difficult to ensure the pressure resistance of the gas storage tank and the heat exchange mechanism, resulting in an increase of sensible heat loss. Accordingly, $P_{GA}$ is preferably 250 (atm) or lower. $P_{GA}$ is more preferably 200 (atm) or lower and, even more preferably, 100 (atm) or lower.

The formula (4) represents a pressure ($P_{GD}$) in the gas storage tank in the desorption process (D) of the gas.

If $P_{GD}$ is excessively low, supply of the gas to the gas consumption device is difficult. Accordingly, $P_{GD}$ is preferably 1.5 (atm) or higher. $P_{GD}$ is more preferably 2 (atm) or higher and, even more preferably, 3 (atm) or higher.

On the other hand, if $P_{GD}$ is excessively high, it is difficult to ensure the pressure resistance of the gas storage tank and the heat exchange mechanism, resulting in an increase of sensible heat loss. Accordingly, $P_{GD}$ is preferably 250 (atm) or lower. $P_{GA}$ is more preferably 200 (atm) or lower and, even more preferably, 100 (atm) or lower.

The formula (5) represents that the pressure ($P_{GA}$) in the gas storage tank in the absorption process (A) of the gas is at or higher than the pressure ($P_{GD}$) in the gas storage tank in the desorption process (D) of the gas. This is because the gas storage amount is increased and the gas absorption and desorption in the gas storage material having hysteresis are also enabled.

[1.8.2. Specific Example of Combination]

A combination of the gas storage material and the chemical heat storage material satisfying the conditions described above includes, for example, a combination in which the gas storage material includes $Ti_{0.3}Zr_{0.05}Mn_{0.45}V_{0.15}Fe_{0.05}$ that absorbs and desorbs hydrogen, and the chemical heat storage material includes $CaCl_2$ using ammonia as the operation medium.

[2. Specific Embodiment of Gas Storage/Supply System]

[2.1. First Embodiment]

FIG. 1 shows a schematic view of a gas storage/supply system according to a first embodiment of the present invention. In FIG. 1, a gas storage/supply system 10 has a gas storage tank 12, a chemical heat storage tank 14, and a heat medium flow channel 16. The gas storage tank 12 and the chemical heat storage tank 14 are independent of each other, and heat medium flow channel 16 for conducting heat exchange is provided in the inside of both of the tanks respectively.

The gas storage tank 12 is connected by way of a pipeline 18a to a gas supply device (for example, a gas cylinder). The gas storage tank 12 is connected by way of a pipeline 18b to a gas consumption device (for example, a fuel cell).

A gas storage material and a chemical heat storage material are filled in the gas storage tank 12 and the chemical heat storage tank 14 respectively and heat is exchangeable between the gas storage material and the chemical heat storage material by way of a heat exchange medium flowing in the heat medium flow channel 16.

The chemical heat storage tank 14 is further connected with a supply/discharge mechanism of the operation medium (not illustrated). The supply/discharge mechanism serves to isolate the operation medium from the chemical heat storage material during heat storage and bring the operation medium into contact with the chemical heat storage material during heat dissipation.

[2.2. Second Embodiment]

FIG. 2 shows a schematic view of a gas storage/supply system according to a second embodiment of the present invention. In FIG. 2, a gas storage/supply system 20 has a gas storage tank 22, a chemical heat storage tank 24, and a heat transfer wall 26. The gas storage tank 22 and the chemical heat storage tank 24 are integrated by way of the heat transfer wall 26 provided at the boundary between them.

The gas storage tank 22 is connected by way of a pipeline 28a to a gas supply device (for example, a gas cylinder). The gas storage tank 22 is connected by way of a pipeline 28b to a gas consumption device (for example, a fuel cell).

A gas storage material and a chemical heat storage material are filled in the gas storage tank 22 and the chemical heat storage tank 24 respectively and heat is exchangeable the between the gas storage material and the chemical heat storage material by way of a heat transfer wall 26.

The chemical heat storage tank 24 is further connected with a supply/discharge mechanism of the operation medium (not illustrated). The supply/discharge mechanism serves to isolate the operation medium from the chemical heat storage material during heat storage and bring the operation medium into contact with the chemical heat storage material during heat dissipation.

[2.3. Third Embodiment]

FIG. 3 shows a schematic view of a gas storage/supply system according to a third embodiment of the present invention. In FIG. 3, a gas storage/supply system 30 has gas storage tanks 32a to 32c, chemical heat storage tanks 34a to 34d, and heat transfer walls 36a to 36f. The respective gas storage tanks 32a to 32c and the respective chemical heat storage tanks 34a to 34d are stacked alternately. Further, the gas storage tanks 32a to 32c and the chemical heat storage tanks 34a to 34d stacked alternately are integrated by way of the heat transfer walls 36a to 36f each provided at the boundary between the gas storage tank and the chemical heat storage tank.

The gas storage tanks 32a to 32c are connected by way of the pipeline 38a to a gas supply device (for example, a gas cylinder). Further, the gas storage tanks 32a to 32c are connected by way of a pipeline 38b to a gas consumption device (for example, a fuel cell).

A gas storage material and a chemical heat storage material are filled in the gas storage tanks 32a to 32c and the chemical heat storage tanks 34a to 34d respectively and heat is exchangeable between the gas storage material and the chemical heat storage material by way of the heat transfer walls 36a to 36f.

The chemical heat storage tanks 34a to 34d are further connected with a supply/discharge mechanism of the operation medium (not illustrated). The supply/discharge mechanism serves to isolate the operation medium from the chemical heat storage material during heat storage and bring the operation medium into contact with the chemical heat storage material during heat dissipation.

[3. Effect]

The gas storage/supply system according to the present invention has a chemical heat storage tank for storing gas absorption heat and reutilizing the same as gas desorption heat. Accordingly, the quantity of heat input from the outside upon gas desorption can be decreased to improve the energy utilization efficiency. Further, since the chemical heat storage material is used as the heat storage means, a heat storage density is high and the heat can be supplied from the chemical heat storage tank to the gas storage tank at an optional timing.

Further, when the heat transfer wall is used as the heat exchange mechanism (that is, when the gas storage tank and the chemical heat storage tank are integrated by way of the heat transfer wall), the heat medium flow channel is not necessary. Further, when a plurality of gas storage tanks and a plurality of chemical heat storage tanks are stacked by way of the heat transfer walls, a heat exchange area increases. As a result, sensible heat loss upon heat exchange between the gas storage tank and the chemical heat storage tank is reduced and a rate of the heat exchange is also improved.

Example

Example 1

The gas storage/supply system illustrated in FIG. 1 was manufactured. $Ti_{0.3}Zr_{0.05}Mn_{0.45}V_{0.15}Fe_{0.05}$ which is a hydrogen absorbing alloy was used as the gas storage material. Further, $CaCl_2$ using ammonia as an operation medium was used as the chemical heat storage material.

Hydrogen was supplied from an external gas supply device to the gas storage tank 12 (hydrogen pressure: 1 MPa, environmental temperature: 25° C.) and hydrogen was absorbed to the hydrogen absorbing alloy. Concurrently, the generated hydrogen absorption heat was supplied by way of the heat exchange mechanism (heat medium flow channel 16) to the chemical heat storage tank 14. As a result, the reaction according to the formula (a) proceeded and the heat could be stored.

$$Ca(NH_3)_8Cl_2 \rightarrow Ca(NH_3)_4Cl_2 + 4NH_3 \quad (a)$$

Subsequently, during desorption of hydrogen from the hydrogen absorbing alloy, the temperature of the hydrogen absorbing alloy was kept at 30° C. by supplying the heat generated from the reverse reaction in the formula (a) from the chemical heat storage tank 14 to the gas storage tank 12. As a result, hydrogen could be supplied (at a supply pressure: 0.2 MPa) to an external hydrogen consumption device.

While the present invention has been described specifically with reference to the preferred embodiments, the present invention is no way restricted to the embodiments described above and can be modified variously within a range not departing from the gist of the present invention.

The gas storage/supply system according to the present invention can be used, for example, as a fuel gas supply system to a fuel cell, and as a fuel gas supply system to an engine using hydrogen, ammonia, methane gas, etc. as a fuel.

What is claimed is:

1. A gas storage/supply system comprising:
   a gas storage material capable of reversibly absorbing and desorbing a gas,
   a gas storage tank having the gas storage material sealed therein,
   a chemical heat storage material capable of reversibly making a forward reaction and a reverse reaction with an operation medium,
   a chemical heat storage tank having the chemical heat storage material sealed therein,
   a heat exchange mechanism configured to transfer heat between the gas storage tank and the chemical heat storage tank, and
   a control mechanism configured to control the gas storage/supply system such that gas absorption heat released upon absorption of the gas to the gas storage material is stored in the chemical heat storage tank, and gas desorption heat which is necessary for desorption of the gas from the gas storage material is supplied from the chemical heat storage tank,
   wherein the following relations of formula (1) to formula (5) are established between the gas storage material and the chemical heat storage material:

$$\Delta H_{GA}/(RlnP_{GA}+\Delta S_{GA}) \geq \Delta H_{CD}/(RlnP_{CD}+\Delta S_{CD}) \quad (1)$$

$$\Delta H_{GD}/(RlnP_{GD}+\Delta S_{GD}) \leq \Delta H_{CA}/(RlnP_{CA}+\Delta S_{CA}) \quad (2)$$

$$1.5 \leq P_{GA} \leq 250 \quad (3)$$

$$1.5 \leq P_{GD} \leq 250 \quad (4)$$

$$P_{GD} \leq P_{GA} \quad (5)$$

where
ΔH (kJ/mol of gas molecule) represents enthalpy change in the reaction,
ΔS (J/K/mol of gas molecule) represents entropy change in the reaction,
P (atm) represents a tank pressure,
R represents a gas constant,
subscript G represents the gas storage material,
subscript C represents the chemical heat storage material,
subscript A represents an absorption process, and
subscript D represents a desorption process.

2. The gas storage/supply system according to claim 1, wherein the heat exchange mechanism is:
   (a) a heat medium flow channel for circulating a heat exchange medium between the gas storage tank and the chemical heat storage tank, and/or
   (b) one or more heat transfer walls provided at the boundary between the gas storage tank and the chemical heat storage tank.

3. The gas storage/supply system according to claim 1, wherein the gas storage material comprises:

(a) one or more materials selected from the group consisting of metals, hydrogen absorbing alloys, complex hydrides, hydrogen storage materials based on physical adsorption, and organic hydrides that absorb and desorb hydrogen,
(b) one or more materials selected from the group consisting of metal halides, metal sulfates, porous oxides, and activated carbon that absorb and desorb ammonia, or
(c) one or more materials selected from the group consisting of metal organic frameworks and porous coordination polymers that absorb and desorb methane, and the chemical heat storage material comprises:
(a) one or more materials selected from the group consisting of metal oxides, metal halides, and metal sulfates using water as the operation medium,
(b) one or more materials selected from the group consisting of metal halides and metal sulfates using ammonia as the operation medium, or
(c) one or more materials selected from the group consisting of metals, hydrogen absorbing alloys, complex hydrides, and organic hydrides using hydrogen as the operation medium.

4. The gas storage/supply system according to claim 1, wherein an auxiliary heating mechanism configured to heat the chemical heat storage material and/or the gas storage material is further provided.

5. The gas storage/supply system according to claim 1, wherein the chemical heat storage material is sealed in the chemical heat storage tank such that the quantity of heat stored in the chemical heat storage material is a quantity of heat obtained by subtracting the sensible heat loss of the gas storage tank and the chemical heat storage tank from the gas absorption heat of the gas storage material.

* * * * *